(12) United States Patent
Campbell, III (10) Patent No.: US 7,588,139 B1
(45) Date of Patent: Sep. 15, 2009

(54) CONVEYOR ASSEMBLY

(76) Inventor: William Arthur Campbell, III, 8103 Kirkwall Ct., Towson, MD (US) 21286

( * ) Notice: Subject to any disclaimer, the term of this patent is extended or adjusted under 35 U.S.C. 154(b) by 0 days.

(21) Appl. No.: 12/189,962

(22) Filed: Aug. 12, 2008

(51) Int. Cl.
 *B65G 15/10* (2006.01)
(52) U.S. Cl. .................. 198/817; 198/407; 198/606; 198/461.3
(58) Field of Classification Search ............... 198/407, 198/412, 413, 461.3, 575, 604–607, 620, 198/799, 817
 See application file for complete search history.

(56) References Cited

U.S. PATENT DOCUMENTS

| | | | |
|---|---|---|---|
| 3,052,339 A * | 9/1962 | Carter | 198/460.1 |
| 3,241,652 A | 3/1966 | Glendy | |
| 3,370,693 A | 2/1968 | Marsden | |
| 3,456,773 A * | 7/1969 | Titmas, Jr. | 198/370.09 |
| 3,747,781 A | 7/1973 | Daigle et al. | |
| 3,799,319 A | 3/1974 | Cutler et al. | |
| 3,911,800 A | 10/1975 | Feldkamper | |
| 4,004,678 A | 1/1977 | Hardy | |
| 4,015,843 A * | 4/1977 | Tennant | 271/240 |
| 4,018,326 A | 4/1977 | Hardy | |
| 4,090,603 A | 5/1978 | Marklund | |
| 4,138,340 A * | 2/1979 | Suzuki et al. | 210/396 |
| 4,529,082 A * | 7/1985 | Mally | 198/434 |
| 4,533,033 A * | 8/1985 | van Wegen | 198/413 |
| 4,591,044 A * | 5/1986 | Ogami et al. | 198/346.3 |
| 4,685,553 A * | 8/1987 | Jennings | 198/405 |
| 4,846,336 A * | 7/1989 | Hoyland et al. | 198/432 |
| 4,934,687 A * | 6/1990 | Hayden et al. | 271/202 |
| 4,960,198 A | 10/1990 | Hogenkamp | |
| 5,125,947 A | 6/1992 | Frenken et al. | |
| 5,168,978 A * | 12/1992 | Cox et al. | 198/369.5 |
| 5,188,355 A | 2/1993 | Lowell et al. | |
| 5,213,202 A * | 5/1993 | Arnold | 198/835 |
| 5,238,100 A | 8/1993 | Rose, Jr. et al. | |
| 5,244,201 A | 9/1993 | Balcerek et al. | |
| 5,267,853 A * | 12/1993 | Arai | 432/59 |
| 5,322,154 A | 6/1994 | Lenherr | |
| 5,520,013 A * | 5/1996 | Kuo | 62/380 |
| 5,609,236 A | 3/1997 | Neukam | |
| 6,145,648 A | 11/2000 | Teichman et al. | |
| 6,152,282 A * | 11/2000 | Ewan et al. | 198/382 |

(Continued)

FOREIGN PATENT DOCUMENTS

WO   WO0176989 A1   10/2001

*Primary Examiner*—Douglas A Hess
(74) *Attorney, Agent, or Firm*—George Willinghan; August Law, LLC (57) ABSTRACT

A conveyor assembly is provided for accumulating and discharging a column of evenly spaced items. The conveyor assembly includes a receiving conveyor, a discharge conveyor and a belt guiding carriage. The receiving and discharge conveyors each include a plurality of round belts that are interlaced with the receiving belts being at a slightly higher elevation on the receiving end of the system and the discharge belts being at a slightly higher elevation on the discharge end. Both sets of belts pass through a movable carriage that guides the receiving belts from the upper elevation to the lower elevation and the discharge belts from the lower elevation to the upper elevation so that the receiving belts are at a higher elevation on the receiving end of the carriage and the discharge belts are at a higher elevation on the discharge end of the carriage.

20 Claims, 4 Drawing Sheets

U.S. PATENT DOCUMENTS

| | | | |
|---|---|---|---|
| 6,164,432 A * | 12/2000 | Monsees | 198/459.4 |
| 6,347,697 B1 * | 2/2002 | Ouellette et al. | 198/358 |
| 6,349,933 B1 * | 2/2002 | Scheffer et al. | 271/177 |
| 6,454,518 B1 * | 9/2002 | Garcia-Balleza et al. | 414/801 |
| 6,866,135 B2 | 3/2005 | Quadracci et al. | |
| 7,065,936 B2 | 6/2006 | Lindee et al. | |
| 7,104,388 B2 * | 9/2006 | Walker | 198/433 |
| 7,409,714 B2 * | 8/2008 | Gupta et al. | 726/23 |

* cited by examiner

CONVEYOR ASSEMBLY

FIELD OF THE INVENTION

The present invention relates to conveyor systems.

BACKGROUND OF THE INVENTION

For machines within a manufacturing process to operate properly, these machines require a steady and controlled rate of product coming to them. One of the easiest ways to accomplish this is to accumulate product on a conveyor behind some type of gating mechanism. Holding product behind a physical gate, however, allows the conveyor to slide under the back log of product, and each product creates more pressure on the products in front of it. Some products can not tolerate this pressure or in the case of some soft or sticky products can not stand any product to product contact.

Previous attempts at solving the problem of a physical gating mechanism and the associated backlog pressure use a system composed of a receiving conveyor and a discharge conveyor connected by a moving transfer point. The receiving conveyor runs faster than the discharge conveyor. Therefore, products on the receiving conveyor will catch up to products on the discharge conveyor. The moving transfer point is located directly behind the last product on the discharge conveyor and follows this product as it moves forward. Just as a product on the receiving conveyor is catching up with the last product on the discharge conveyor, the moving transfer moves back to create a space on the discharge conveyor for this products and starts following the new last product. A disadvantage of this system is that in addition to the moving transfer, a moving support for the receiving and discharge conveyors and a system to take up and let out the belts as the transfer moves are required. This adds to the inertia load every time the moving transfer changes acceleration.

SUMMARY OF THE INVENTION

Systems and methods in accordance with the present invention eliminate the need for a moving support for the conveyors and the need for a system to take up and let out the belts. The receiving and discharge conveyors each include one or more round belts. The receiving and discharge belts are located so that they overlap and are interlaced. The receiving belts are at a slightly higher elevation on the receiving end of the system, and the discharge belts are at a slightly higher elevation on the discharge end. Both sets of belts pass through a movable carriage. This carriage guides the receiving belts from the upper elevation to the lower elevation and the discharge belts from the lower elevation to the upper elevation so that the receiving belts are at a higher elevation on the receiving end of the carriage and the discharge belts are at a higher elevation on the discharge end of the carriage. Items moving through this system are conveyed by the receiving conveyor while passing over the lower discharge belts until those items reach the carriage at which point the items are conveyed by the higher discharge belts while passing over the lower receiving conveyor.

The receiving conveyor operates at a greater speed than the discharge conveyor so that items on the receiving conveyor catch up to items on the slower discharge conveyor. Sensors detect the position of items on the receiving conveyor. As an item approaches the carriage, the carriage moves back relative to the last item on the discharge conveyor, creating a space for the new item on the discharge conveyor. The carriage then moves forward following the last item on the discharge conveyor until time to move back for the next item. Thus, items feed onto the receiving conveyor at random are accumulated with no or very light contact and discharged at a uniform rate and spacing.

The receiving conveyor includes a plurality of round belts driven by a drive roller. The receiving conveyor may be routed around additional rollers or pulleys. The discharge conveyor is also driven by a drive roller and can also be routed over additional rollers and pulleys. The carriage moves parallel to the travel or rotational direction of the receiving and discharge belts. The carriage is driven by two parallel timing belts or by other suitable mechanisms such as a ball screw. The carriage contains at least one and preferably two bars with high and low belt guides that the receiving and discharge belts pass through. The receiving belts enter the receiving side of the carriage at a higher elevation than the discharge belts. The belt guides move the receiving conveyor belts down and to one side so they are following a lower path as they exit from the discharge side of the carriage. The belt guides move the discharge belts up and to one side so they follow a higher path when exiting from the discharge end of the carriage. The carriage rides on a grooved bed. The conveyor belts at the higher elevation are supported by the bed while the belts at the lower elevation are in the grooves of the grooved bed.

The receiving and discharge conveyors and the carriage all have independent drives and encoders. A receiving sensor detects product on the receiving conveyor and transmits this data to the controller. The controller then tracks this product as it moves to the carriage position and instructs the carriage to move back at the appropriate time so that the products accumulate on the discharge conveyor with very little or no contact.

In accordance with one exemplary embodiment, the present invention is directed to a conveyor assembly having a grooved bed with a first end, a second end, a top surface extending from the first end to the second end and first and second parallel grooves running through the top surface. A first conveyor belt runs along the top surface of the grooved bed at the first end and runs through the second groove in the grooved bed at the second end. A second conveyor belt runs through the first groove in the grooved bed at the first end and runs along the top surface of the grooved bed at the second end. The conveyor assembly includes a transition area between the first and second ends of the grooved bed. The first conveyor belt passes from the top surface to the second groove, and the second conveyor belt passes from the second groove to the top surface at the transition area.

In one embodiment, the first and second conveyor belts each have a lateral bend in the transition area in a direction perpendicular to the grooves. In one embodiment, the first conveyor belt extends a first distance above the top surface at the first end and a second distance above the top surface at the second end. The first distance is greater than the second distance. The second conveyor belt extends the second distance above the top surface at the first end and the first distance above the top surface at the second end. In one embodiment, the conveyor assembly also includes a carriage extending over the top surface of the grooved bed and moveable towards either the first end or second end of the grooved bed to define a location for the transition area. The first and second conveyor belts pass through the carriage. In one embodiment, the carriage also includes a first bar and a second bar spaced from the first bar. The first and second bars extend perpendicular to the grooves, and the first bar is disposed between the first end of the grooved bed and the second bar. In one embodiment, the first bar includes a high belt guide and a low belt guide. The first bar low belt guide is disposed over the first groove. The second bar includes a high belt guide and a low belt guide. The second bar low belt guide disposed over the second groove. The first bar high belt guide and second bar high belt guide are aligned along an axis parallel to the first and second grooves.

In one embodiment, the first conveyor belt runs through the first bar high belt guide and the second bar low belt guide, and the second conveyor belt runs through the first bar low belt guide and the second bar high belt guide. In one embodiment, the grooved bed has a plurality of parallel grooves, and the conveyor assembly also includes a plurality of first conveyor belts running along the top surface of the grooved bed at the first end and running through the grooves in the grooved bed at the second end and a plurality of second conveyor belts running through the grooves in the grooved bed at the first end and running along the top surface of the grooved bed at the second end. The first conveyor belts pass from the top surface to the grooves, and the second conveyor belts pass from the grooves to the top surface at the transition area. In one embodiment, the conveyor assembly includes a carriage extending over the top surface of the grooved bed. The carriage is moveable towards either the first end or second end of the grooved bed to define a location for the transition area. The carriage includes a first bar having a plurality of high belt guides and a plurality of low belt guides. The first bar low belt guides are disposed over the plurality of grooves. The carriage also includes a second bar parallel to the first bar and having a plurality of high belt guides and a plurality of low belt guides. The second bar low belt guides are disposed over the plurality of grooves. The first bar high belt guides and second bar high belt guides are aligned along axes parallel to the plurality of grooves and laterally offset from the lower belt guides along an axis perpendicular to the plurality of grooves.

In one embodiment, the first conveyor belts run through the first bar high belt guides and the second bar low belt guides, and the second conveyor belts run through the first bar low belt guides and the second bar high belt guides.

The present invention is also directed to a conveyor assembly having a plurality of first belts rotating around a first pulley and a second pulley and a plurality of second belts rotating around a third pulley and a fourth pulley. The pulleys are arranged in a line such that the third pulley is disposed between the first pulley and the second pulley and the second pulley is disposed between the third pulley and the fourth pulley. The conveyor assembly includes a carriage having two bars extending perpendicularly across the first and second pluralities of belts. These two bars include a first bar disposed between the third pulley and the second bar and having a plurality of high belt guides and a plurality of low belt guides, and a second bar disposed between the first bar and the second pulley and having a plurality of high belt guides and a plurality of low belt guides. Each one of the first conveyor belts runs through one of the first bar high belt guides and one of the second bar low belt guides, and each one of the second conveyor belts runs through one of the first bar low belt guides and one of the second bar high belt guides.

In one embodiment, each one of the first conveyor belts and each one of the second conveyor belts has a lateral bend in a transition area between the first and second bars. This lateral bend extends in a direction perpendicular to a direction of rotation of the first and second conveyor belts. In one embodiment, each one of the first and second plurality of conveyor belts has a top surface. The first conveyor belt top surfaces between the first pulley and the first bar and the second conveyor belt top surfaces between the second bar and the fourth pulley disposed in a first plane, and the first conveyor belt top surfaces between the second bar and the second pulley and the second conveyor belt top surfaces between the third pulley and the first bar disposed in a second plane. The first plane is spaced from the first plane. In one embodiment, the first plane is spaced from the second plane a distance less than a thickness of the first and second conveyor belts.

In one embodiment, the first conveyor belt top surfaces transition from the first plane to the second plane when moving from the first bar to the second bar, and the second conveyor belt top surfaces transition from the second plane to the first plane when moving from the first bar to the second bar. In one embodiment, the conveyor assembly includes a drive mechanism in communication with the carriage to move the first and second bars along the first and second conveyor belts between the third pulley and the second pulley. In one embodiment, the drive mechanism includes two timing belts attached to the carriage on either side of the first and second conveyor belts.

Exemplary embodiments of the present invention are also directed to a method for accumulating and discharging a column of evenly spaced items on a conveyor assembly. In accordance with this method, a plurality of parallel first conveyor belts and a plurality of parallel second conveyor belts are rotated, for example around pulleys. The second conveyor belts are parallel to the first conveyor belts and are interspersed with the first conveyor belts along a given length. The first conveyor belts transition from a first height to second height with respect to a given plane in a direction of rotation within the given length. In addition, the second conveyor belts transition from a third height to a fourth height with respect to the given plane in the direction of rotation within the given length. In one embodiment, the third height is less than the first height, and the second height is less than the fourth height. A transition area is defined within the given length of interspersed first and second conveyor belts wherein the first conveyor belts and the second conveyor belts shift laterally in a direction perpendicular to the direction of rotation to transition from the first height to the second height and from the third height to the fourth height respectively.

In one embodiment, defining the transition area further including routing the first conveyor belts through high belt guides one a first bar and low belt guides on a second bar and routing the second conveyor belts though low belt guides on the first bar and high belt guides on the second bar. In addition, the first and second bars are moved along the first and second conveyor belts to move the transition area. In one embodiment, transitioning the first conveyor belts includes moving each first conveyor belt from a top surface of a grooved bed to one of a plurality of parallel grooves in the grooved bed. In addition, transitioning the second conveyor belts includes moving each second conveyor belt from one of the parallel grooves to the top surface.

DETAILED DESCRIPTION

Figure 1:
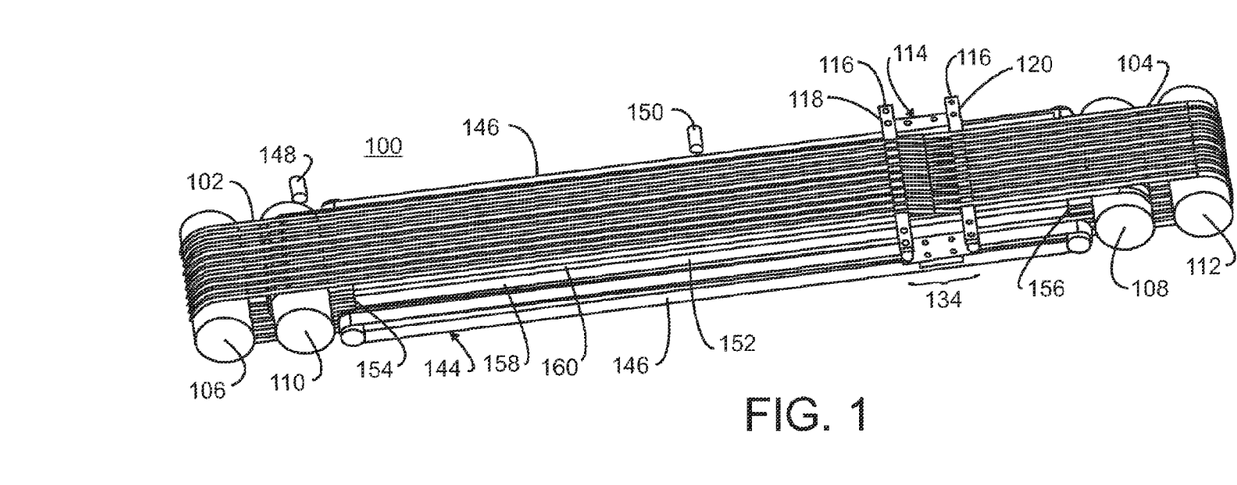
FIG. 1 is a perspective view an embodiment of a conveyor assembly in accordance with the present invention.
Figure 2:
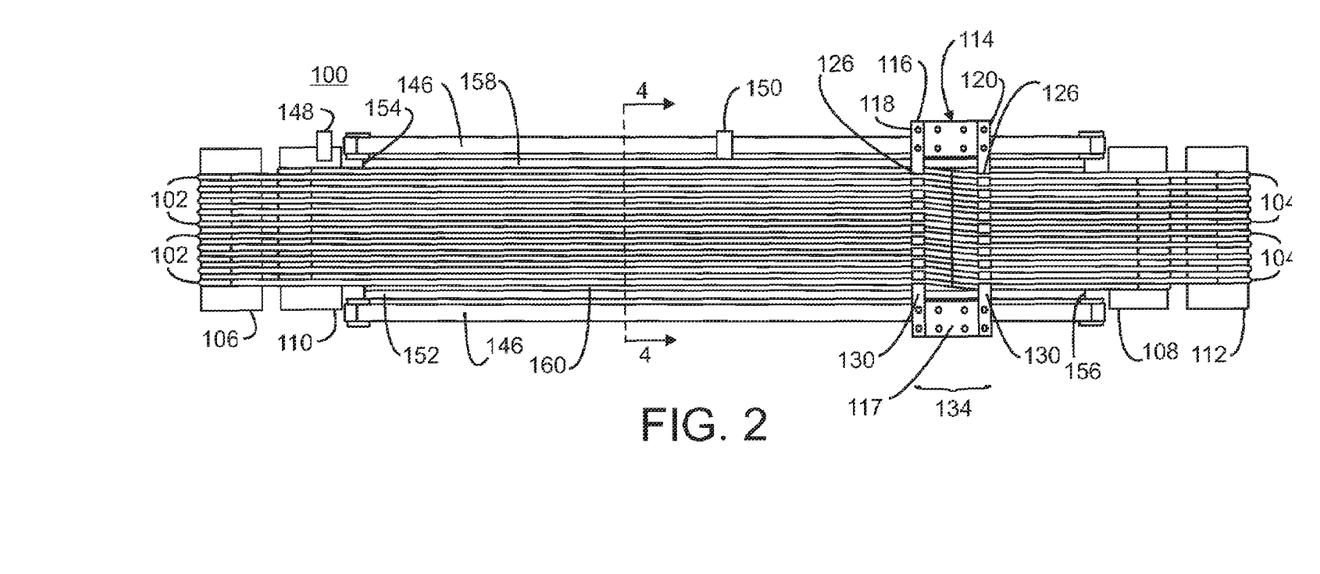
FIG. 2 is a top view of the conveyor assembly.
Figure 3:
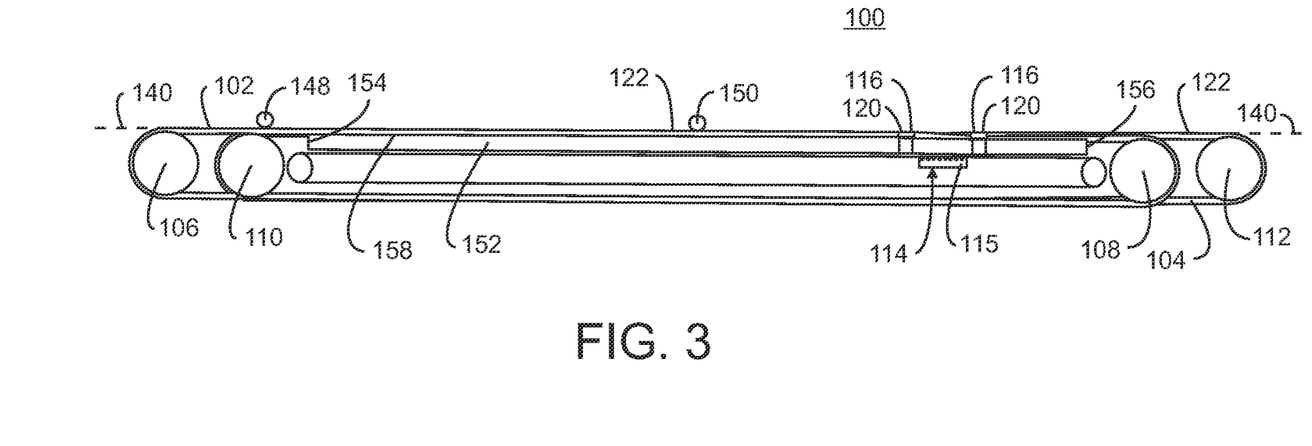
FIG. 3 is a side view of the conveyor assembly.

Referring initially to FIGS. 1-3, exemplary embodiments of the present invention are directed to a conveyor assembly 100. The conveyor assembly moves manufactured products, for example baked goods or confections, between stations or processes in a manufacturing facility. In addition to moving products between two stations or processes, the conveyor assembly compensates for any differences in speed between the two processes, acting as a buffer or accumulator in the system. The conveyor assembly includes at least one first conveyor belt 102, referred to as a receiving belt, and at least one second conveyor belt 104, referred to as the discharge belt. Although the present invention can utilize just two belts, a single first conveyor belt and a single second conveyor belt, preferably, the conveyor assembly includes a plurality of first conveyor belts 102 and a plurality of second conveyor belts 104. Suitable types and materials for the conveyor belts are known and available in the art. The conveyor belts can have a square or circular cross section. In one embodiment, each conveyor belt is a chain. Preferably, the conveyor belts are constructed from a rubber-based compound and include reinforcing materials such as cord.

The plurality of first conveyor belts 102 rotates around at least two pulleys, a first pulley 106 and a second pulley 108. The plurality of second conveyor belts 104 also rotates around two pulleys, a third pulley 110 and a fourth pulley 112. The pulleys are arranged in a line such that the third pulley 110 is disposed between the first 106 pulley and the second pulley 108 and the second pulley 108 is disposed between the third pulley 110 and the fourth pulley 112. In one embodiment, the first and fourth pulleys are substantially co-planar, and the third and second pulleys are substantially co-planar. Suitable materials for the pulleys are known and available in the art. In one embodiment, at least one of the pulleys in each pair of pulleys is attached to a power source (not shown) to rotate the pulleys and the belts attached to those pulleys as would be understood by one of skill in the art. Although additional pulleys could be included, preferably, the conveyor assembly includes just the four pulleys, making the arrangement simple and compact and easily inserted or retro-fit into an existing manufacturing process.

In one embodiment, the plurality of first conveyor belts are parallel, and the plurality of second conveyor belts are also parallel to each other and to the first conveyor belts. The first and second conveyor belts are preferably interspersed along a given length and in particular are arranged in an alternating pattern of first conveyor belt, second conveyor belt, first conveyor belt, etc. The first and second conveyor belts rotate in the same direction; however, the first and second belts preferably rotate at different speeds. In one embodiment, the second conveyor belts rotate at a slower speed than the first conveyor belts.

Figure 4:
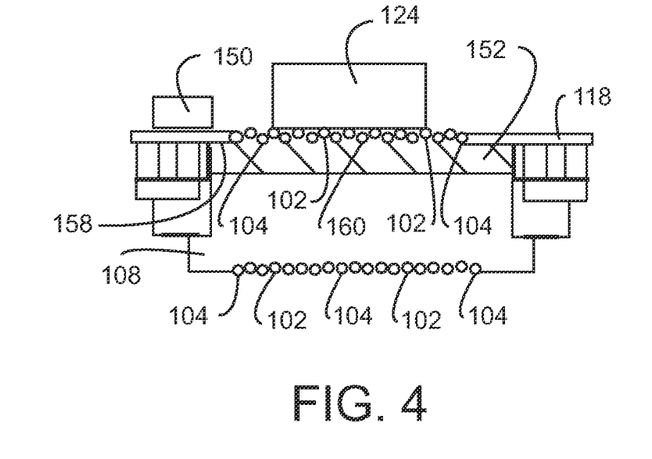
FIG. 4 is a view through line 4-4 of FIG. 2.

The first and second conveyor belts are interspersed in a region generally defined between the third pulley 110 and the second pulley 108. As is best illustrated in FIG. 4, a difference exists in the relative heights of the first conveyor belts 102 and the second conveyor belts 104 within the region where the conveyor belts overlap or are interspersed. Products 124 carried along the conveyor assembly 100 contact only the top surfaces 122 (FIG. 3) of both the first and second conveyor belts. Therefore, when one set of belts is higher than the other set of belts, as in the first set of conveyor belts in FIG. 4, the product 124 is only in contact with the top surfaces 122 of the first conveyor belts 102. The product 124 is, therefore, conveyed along by the first conveyor belts 102 at whatever speed the first conveyor belts are moving, and the second conveyor belts 104 move along underneath the product without interacting with the product 124. Switching the product between the two sets of conveyor belts is accomplished by changing the relative heights of the first and second conveyor belts.

Exemplary embodiments of conveyor assemblies 100 in accordance with the present invention include mechanisms that provide for a change in the relative height between the first conveyor belts 102 and the second conveyor belts 104. These changes in relative heights transition the products moving on the conveyor assembly between the first conveyor belts and the second conveyor belts. In one embodiment, the conveyor assembly includes a carriage 114 that includes two bars 116 that extend perpendicularly across the first and second pluralities of belts. These two bars include a first bar 118 and a second bar 120. The first bar 118 is disposed between the third pulley 110 and the second bar 120, and the second bar is disposed between the first bar 118 and the second pulley 108. Suitable materials for the bars include plastics, ceramics and metals such as stainless steel. In one embodiment, the bars are spaced apart from about 4 inches to about 6 inches.

Figure 7:
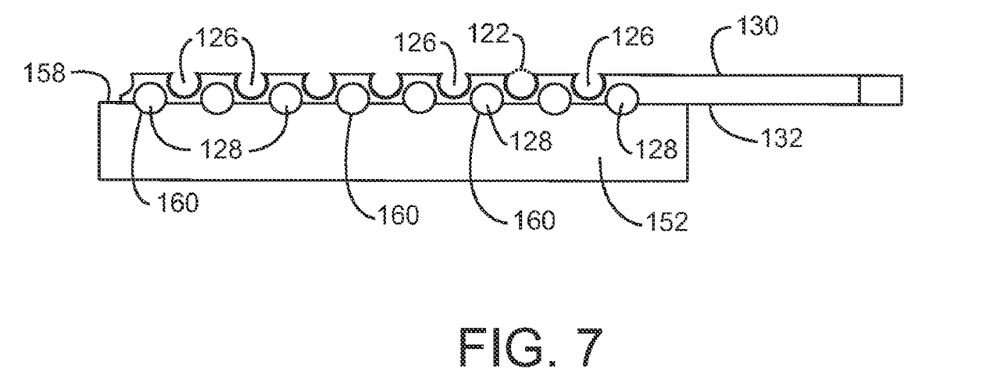
FIG. 7 is an illustration of an embodiment of a carriage bar guide and grooved bed in accordance with the present invention.

Referring to FIG. 7, each bar includes a plurality of high belt guides 126 and a plurality of low belt guides 128. Therefore, the first bar 118 includes a plurality of first bar low belts guides and a plurality of first bar high belt guides, and the second bar includes a plurality of second bar low belt guides and a plurality of second bar high belt guides. Each belt guide has a cross sectional shape corresponding to the shape of the conveyor belts and is size to be large enough to allow a conveyor belt to pass through the guide without binding. As illustrated, each belt guide has a generally circular cross section. Each guide can also include lubricating materials such as a Teflon® lining and beveled or chamfered edges to facilitate passage of the conveyor belts through the guide. The high belt guides extend around the circumference of each conveyor belt. Preferably, the high belt guides extend around more than half the circumference of the conveyor belts; therefore, the high belt guide holds the conveyor belts in place and prevents the conveyor belts from rising up out of the guide. The top surface 122 of each belt extends out of the high belt guide and is above an upper side 130 of the bar. In one embodiment, the low belt guides extend half the circumference around each conveyor belt. Preferably, the low belt guide extends around more than half the circumference of each conveyor belt so that each conveyor belt extends beyond the lower side 132 of each bar.

The carriage and in particular the belt guides on the two bars are used to change the relative heights of the first and second conveyor belts to transition the products moved along the conveyor system from the first conveyor belt to the second conveyor belt. In one embodiment, each one of the first conveyor belts runs through one of the first bar high belt guides and one of the second bar low belt guides. Each one of the second conveyor belts runs through one of the first bar low belt guides and one of the second bar high belt guides. Therefore, the first conveyor belts transition from a relatively high position to a relatively low position when moving from the first bar to the second bar, which is in the direction of rotation of the first and second conveyor belts. Conversely, the second conveyor belts transition from a relatively low position to a relatively high position when moving from the first bar to the second bar. Therefore, the carriage 114 is disposed in and defines a transition area 134 of the conveyor assembly 100. This creates a transition area having a length of fro about 4 inches to about 6 inches.

Figure 5:
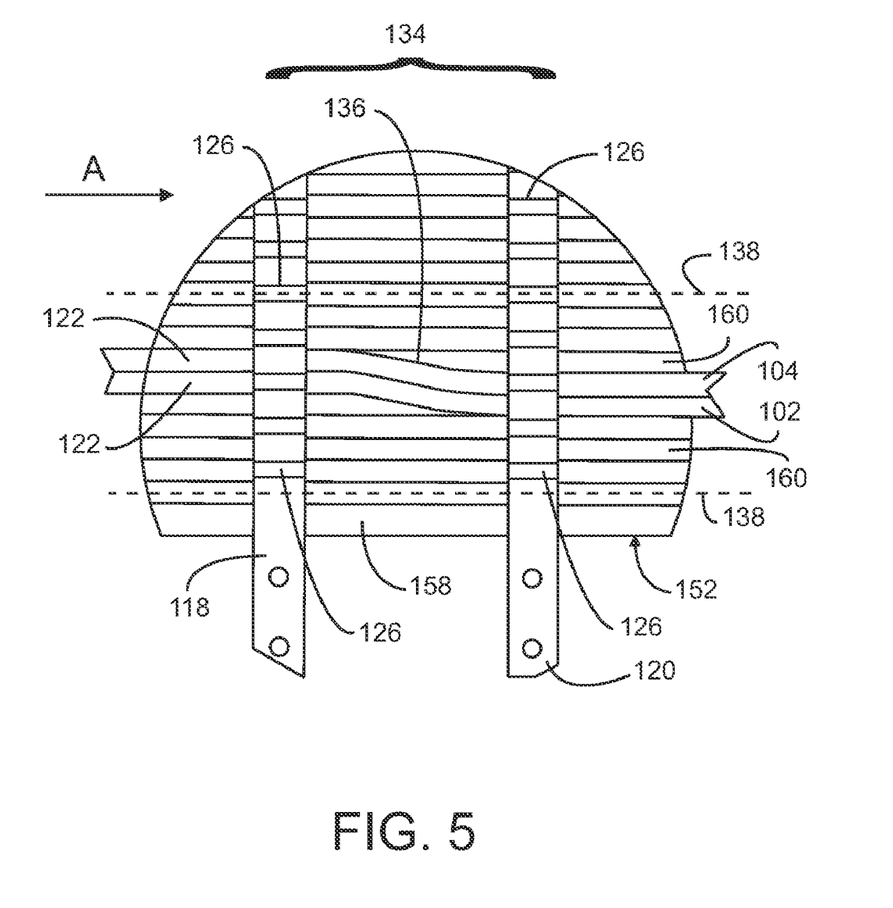
FIG. 5 is a view of a section of the grooved bed and carriage of the present invention.
Figure 6:
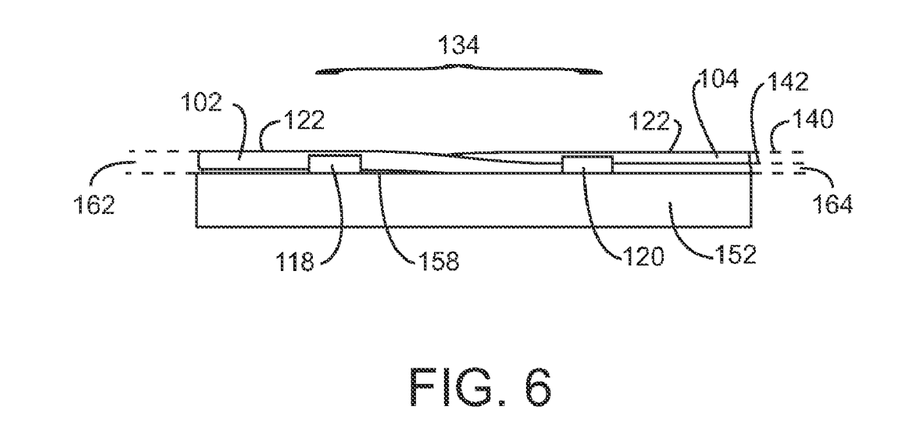
FIG. 6 is a side view of a partial section of the conveyor assembly in a transition area.

Referring to FIGS. 5 and 6, in one embodiment, each one of the first conveyor belts 102 and each one of the second conveyor belts 104 includes a lateral bend 136 in the transition area 134 between the first and second bars. The lateral bends 136 extend in a direction perpendicular to a direction of rotation of the first and second conveyor belts as indicated by arrow A. The lateral bends are illustrated in FIG. 5 for a single first conveyor belt 102 and a single second conveyor belt 104; however, the lateral bends are the same for all of the plurality of first and second conveyor belts. The first bar high belt guides 126 and second bar high belt guides 126 are aligned along parallel axes 138 and are laterally offset from the lower belt guides along an axis perpendicular to the direction of rotation of the conveyor belts. The lower belt guides are also aligned along parallel axes. Therefore, a given conveyor belt when moving from a high belt guide to a low belt guide or from a low belt guide to a high belt guide shifts laterally between the offset parallel axes. All first and second conveyor belts laterally shift and move between the high and low belt guides, and therefore the high and low relative positions, without overlapping or crossing. The belts remain parallel in the region of the shift.

As illustrated in FIGS. 3 and 6, the top surfaces 122 of the first and second conveyor belts transition between two planes at two different heights. Each one of the first and second conveyor belts includes a top surface 122 to make contact with the products traveling along the conveyor assembly 100. The first conveyor belt top surfaces 122 between the first pulley 106 and the first bar 118 and the second conveyor belt top surfaces 122 between the second bar 120 and the fourth pulley 112 are disposed in a first plane 140. The first conveyor belt top surfaces 122 between the second bar 120 and the second pulley 108 and the second conveyor belt top surfaces 122 between the third pulley 110 and the first bar 118 are disposed in a second plane 142. The first plane 140 is spaced from the second plane 142. Preferably, the first plane 140 is spaced from the second plane 142 a distance less than the thickness of the first and second conveyor belts. The first conveyor belt top surfaces 122 transition from the first plane 140 to the second plane 142 when moving from the first bar 118 to the second bar 120, and the second conveyor belt top surfaces 122 transition from the second plane 142 to the first plane 140 when moving from the first bar 118 to the second bar 120. Products carried by the conveyor assembly are in contact with the top surfaces 122 located in the first plane 140.

The transition area defines the transition of products between the first conveyor belts and the second conveyor belts. This transition area can be moved to accommodate increases or decreases in the number of products that accumulate on the first conveyor belts before being transferred to the second conveyor belt. Movement of the transition area 134 is accomplished by moving the carriage 114 between the third pulley 110 and the second pulley 108. In one embodiment, the conveyor assembly 100 includes a drive mechanism 144 in communication with the carriage 114 to move the first and second bars along the first and second conveyor belts between the third pulley 110 and the second pulley 108. Suitable drive mechanisms include two timing belts 146 attached to the carriage 114 on either side of the first and second conveyor belts. The carriage is fixedly attached to each timing belt so that rotation of the timing belts moves the carriage along the lengths of the conveyor belts. In one embodiment, the timing belt is attached to the carriage by a clamp that is bolted to the carriage. The clamp includes a bottom plate 115 (FIG. 3) with grooves to match the timing belt teeth and a top plate 117 (FIG. 2) that bolts to the bottom plate. The timing belt is clamped between the top and bottom plate. Suitable arrangements of timing belts, timing belt sprockets, bottom plates with grooves and top plates are known and commercially available in the art. In one embodiment, the carriage includes bottom plates and top plates on either side of the conveyor belts, and the bars are bolted to and extend between the top plates.

The timing belts run parallel to the first and second conveyor belts. Control electronics and sensors are provided to control the motion and location of the carriage 114. In one embodiment, a first sensor 148 is disposed adjacent the third pulley 110, and a second sensor 150 is provided between the third pulley 110 and the second pulley 108. Suitable sensors include optical sensors, for example infrared sensors, that can detect the presence or absence of products on the conveyor belts at the location of the sensor. The sensors provide information regarding when products enter the region between the third and second pulleys, the rate at which products are moving between the sensors and whether products are accumulating on the conveyor belts as well as the amount of product accumulation. Given the information obtained from the sensors, the carriage in moved in the appropriate direction along the conveyor belts. Suitable control electronics and sensors are known and available in the art. In one embodiment, the conveyor system is controlled by a programmable logic controller (PLC) or a computer. The receiving conveyor and carriage drive systems are equipped with encoders. When the receiving photocell 148 detects a new product the receiving conveyor's encoder reading is placed in a first in first out stack (FIFO). The controller using the encoder data calculates the speed of the receiving conveyor as known in the art. The controller takes the top encoder reading from the FIFO and calculates the position of this product (the next product to reach the carriage) as known in the art. From the speed and position of this product the controller calculates the time and speed for the carriage to move back and create a space for the product. After the product is on the discharge conveyor the controller will repeat the process with the next encoder reading from the FIFO.

In one embodiment, the conveyor assembly also includes a fixed grooved bed 152 extending under the conveyor belts, or within the rotating loops of the conveyor belts, between the third pulley 110 and the second pulley 108. Suitable materials for the grooved bed 152 include plastics, ceramics and metals such as stainless steel. The grooved bed 152 works in conjunction with the carriage to facilitate the transition of the relative heights of the first and second conveyor belts. The grooved bed preferably does not move and provide all of the support for the conveyor belts in the conveyor assembly. Therefore, the overall depth of the conveyor assembly is defined by the size of the first through fourth pulleys with the conveyor belts. The grooved bed 152 includes a first end 154, a second end 156 opposite the first end and a top surface 158 extending from the first end 154 to the second end 156. In one embodiment, the grooved bed includes at least two parallel grooves 160, e.g., first and second parallel grooves, running through the top surface 158. Preferably, the grooved bed 152 includes a plurality of parallel grooves 160 running through the grooved bed between the first and second ends. The parallel grooves 160 divide the top surface 158 into a plurality of parallel sections between the grooves as illustrated in FIG. 5. In one embodiment, the parallel grooves 160 are arranged parallel to the first and second conveyor belts. The parallel grooves have a cross-sectional shape that is complementary to the shape of the conveyor belts. Alternatively, the parallel grooves are a shaped other than the cross-sectional shape of the belt, e.g., a round belt in square groove or a groove that is a slot.

As illustrated in FIG. 7, in one embodiment, each one of the plurality of parallel grooves has a semi-circular cross-sectional shape to compliment the circular conveyor belts. Preferably, the semi-circular shape is less than or equal to one-half the circumference of the conveyor belts so that the conveyor belts can move freely into and out of the grooves. FIG. 7 also illustrates that the high conveyor belts moving along the top surface 158 of the grooved bed are picked-up or lifted above the top surface 158 of the grooved bed in the area of the carriage 114. This raises the top surfaces of the higher conveyor belts slightly above the first plane 140 in the region of the carriage. The conveyor belts are only lifted about 1/16 of an inch, corresponding to the amount of material in the bar below the high belt guides in each bar of the carriage. This material and the spacing of the high belt guides facilitate the placement of both the high and low belt guides in a single bar without having to cut the guide bar 132 in half, as the high and low belt guides overlap along the length of the bars.

In one embodiment, the first conveyor belts 102 run along the top surface 158 of the grooved bed 152 at the first end 154 and run through the plurality of grooves 160 in the grooved bed 152 at the second end 156. The second conveyor belts 104 run through the plurality of grooves 160 in the grooved bed 152 at the first end 154 and run along the top surface 158 of the grooved bed 152 at the second end 156. The first conveyor belts 102 pass from the top surface 158 to the grooves 160 in the transition area 134 defined by the carriage 114, and the second conveyor belts 104 pass from the grooves 160 to the top surface 158 at the transition area. The lateral bends 136 in the first and second conveyor belts in the transition area between the first and second bars of the carriage are in a direction perpendicular to the plurality of grooves. Therefore, each conveyor belt in the transition area shifts laterally between the grooves and the top surface of the grooved bed.

Referring to FIG. 6, the first conveyor belts 102 extend a first distance 162 above the top surface 158 from the first end to the first bar and a second distance 164 above the top surface 158 from the second bar 120 to the second end. The first distance 162 is greater than the second distance 164. The second conveyor belts 104 extend the second distance 164 above the top surface 158 from the first end 154 to the first bar 118 and the first distance 162 above the top surface 158 from the second bar 120 to the second end 156. The carriage 114 extends over the top surface of the grooved bed and is moveable towards either the first end or second end of the grooved bed to define the location for the transition area. As was discussed above, the first and second conveyor belts pass through the carriage.

As is illustrated in FIGS. 2 and 5, the first and second bars of the carriage extend perpendicular to the grooves. The first bar 118 is disposed between the first end of the grooved bed and the second bar 120. The high belt guides of the first and second bars are aligned along axes 138 parallel to the first and second grooves 160 but are disposed over the top surface 158 portions of the grooved bed 152. The low belt guides are aligned with and disposed over the grooves 160 in the grooved bed. The first conveyor belts 102 when moving through the transition area 134 move from the high belt guides 126 in the first bar 118 to the low belt guides 128 in the second bar 120 and into the grooves 160 over which the low belt guides are located. The second conveyor belts 104 when moving through the transition area 134 move from the low belt guides 128 in the first bar 118 out of the grooves 160 aligned with the first bar low belt guides and into the high belt guides 126 in the second bar 120. This changes the relative heights between the first and second conveyor belts and provides for the exchange of products from the first conveyor belts to the second conveyor belts.

Exemplary embodiments of the present invention are also directed to a method for accumulating and discharging a column of evenly spaced items on the conveyor assembly of the present invention. The plurality of parallel first conveyor belts and the plurality of parallel second conveyor belts are rotated around a corresponding pair of sprockets, drive wheels or pulleys. The second conveyor belts are parallel to the first conveyor belts and are interspersed with the first conveyor belts along a given length. The first conveyor belts are transitioned from a first height to second height with respect to a given plane in a direction of rotation within that given length of overlap with the second conveyor belts. In addition, the second conveyor belts are transitioned from a third height to a fourth height with respect to the given plane in the direction of rotation within the given length. The third height is less than the first height and the second height is less than the fourth height. Preferably, the third and second heights are equivalent, and the first and fourth heights are equivalent as discussed above. The pulleys around which the conveyor belts rotate can be positioned so as to create the relative changes in height between the conveyor belts. A transition area is defined within the given length of interspersed first and second conveyor belts. In this transition area, the first conveyor belts and the second conveyor belts shift laterally in a direction perpendicular to the direction of their rotation to transition from the first height to the second height and from the third height to the fourth height respectively.

In one embodiment, in order to define the transition area, the first conveyor belts are routed through high belt guides on first bar and low belt guides on a second bar, and the second conveyor belts are routed through low belt guides on the first bar and high belt guides on the second bar. This transitions the relative heights between the first and second conveyor belts. In one embodiment, these bars, which are fixed with respect to each other, are moved along the first and second conveyor belts to move the transition area. In one embodiment, a grooved bed is used in the transition area, and each first conveyor belt is moved from a top surface of the grooved bed to one of a plurality of parallel grooves in the grooved bed. In addition, each second conveyor belt is moved from one of the parallel grooves to the top surface. In one embodiment, the first and second bars are used to assist in the movement of the conveyor belts between the grooves and the top surface of the grooved bed. This grooved bed is located under the first and second conveyor belts and provides support for the conveyor belts throughout the transition area.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A conveyor assembly comprising:
    a grooved bed comprising a first end, a second end, a top surface extending from the first end to the second end and first and second parallel grooves running through the top surface;
    a first conveyor belt running along the top surface of the grooved bed at the first end and running through the second groove in the grooved bed at the second end;

a second conveyor belt running through the first groove in the grooved bed at the first end and running along the top surface of the grooved bed at the second end; and a transition area between the first and second ends of the grooved bed, the first conveyor belt passing from the top surface to the second groove and the second conveyor belt passing from the first groove to the top surface at the transition area.

2. The conveyor assembly of claim 1, wherein the first and second conveyor belts each comprise a lateral bend in the transition area in a direction perpendicular to the grooves.

3. The conveyor assembly of claim 1, wherein:
the first conveyor belt extends a first distance above the top surface at the first end and a second distance above the top surface at the second end, the first distance greater than the second distance; and
the second conveyor belt extends the second distance above the top surface at the first end and the first distance above the top surface at the second end.

4. The conveyor assembly of claim 1, further comprising a carriage extending over the top surface of the grooved bed and moveable towards either the first end or second end of the grooved bed to define a location for the transition area, the first and second conveyor belts passing through the carriage.

5. The conveyor assembly of claim 4, wherein the carriage further comprises a first bar and a second bar spaced from the first bar, the first and second bars extending perpendicular to the grooves and the first bar disposed between the first end of the grooved bed and the second bar.

6. The conveyor assembly of claim 5, wherein:
the first bar comprises a high belt guide and a low belt guide, the first bar low belt guide disposed over the first groove;
the second bar comprises a high belt guide and a low belt guide, the second bar low belt guide disposed over the second groove; and
the first bar high belt guide and second bar high belt guide aligned along an axis parallel to the first and second grooves.

7. The conveyor assembly of claim 6, wherein the first conveyor belt runs through the first bar high belt guide and the second bar low belt guide and the second conveyor belt runs through the first bar low belt guide and the second bar high belt guide.

8. The conveyor assembly of claim 1, wherein the grooved bed further comprises a plurality of parallel grooves and the assembly further comprises:
a plurality of first conveyor belts running along the top surface of the grooved bed at the first end and running through the grooves in the grooved bed at the second end; and
a plurality of second conveyor belts running through the grooves in the grooved bed at the first end and running along the top surface of the grooved bed at the second end;
the first conveyor belts passing from the top surface to the grooves and the second conveyor belts passing from the grooves to the top surface at the transition area.

9. The conveyor assembly of claim 8, further comprising a carriage extending over the top surface of the grooved bed and moveable towards either the first end or second end of the grooved bed to define a location for the transition area, the carriage comprising:
a first bar comprising a plurality of high belt guides and a plurality of low belt guides, the first bar low belt guides disposed over the plurality of grooves; and a second bar parallel to the first bar and comprising a plurality of high belt guides and a plurality of low belt guides, the second bar low belt guides disposed over the plurality of grooves;
the first bar high belt guides and second bar high belt guides aligned along axes parallel to the plurality of grooves and laterally offset from the lower belt guides along an axis perpendicular to the plurality of grooves.

10. The conveyor assembly of claim 9, wherein the first conveyor belts run through the first bar high belt guides and the second bar low belt guides and the second conveyor belts run through the first bar low belt guides and the second bar high belt guides.

11. A conveyor assembly comprising:
a plurality of first belts rotating around a first pulley and a second pulley;
a plurality of second belts rotating around a third pulley and a fourth pulley, the pulleys arranged in a line such that the third pulley is disposed between the first pulley and the second pulley and the second pulley is disposed between the third pulley and the fourth pulley; and
a carriage comprising two bars extending perpendicularly across the first and second pluralities of belts, the two bars comprising:
a first bar disposed between the third pulley and the second bar and comprising a plurality of high belt guides and a plurality of low belt guides; and
a second bar disposed between the first bar and the second pulley and comprising a plurality of high belt guides and a plurality of low belt guides;
each one of the first conveyor belts running through one of the first bar high belt guides and one of the second bar low belt guides and each one of the second conveyor belts running through one of the first bar low belt guides and one of the second bar high belt guides.

12. The conveyor assembly of claim 11, wherein each one of the first conveyor belts and each one of the second conveyor belts comprises a lateral bend in a transition area between the first and second bars, the lateral bend extending in a direction perpendicular to a direction of rotation of the first and second conveyor belts.

13. The conveyor assembly of claim 11, wherein each one of the first and second plurality of conveyor belts comprises a top surface, the first conveyor belt top surfaces between the first pulley and the first bar and the second conveyor belt top surfaces between the second bar and the fourth pulley disposed in a first plane and the first conveyor belt top surfaces between the second bar and the second pulley and the second conveyor belt top surfaces between the third pulley and the first bar disposed in a second plane, the first plane spaced from the first plane.

14. The conveyor assembly of claim 13, wherein the first plane is spaced from the second plane a distance less than a thickness of the first and second conveyor belts.

15. The conveyor assembly of claim 13, wherein the first conveyor belt top surfaces transition from the first plane to the second plane when moving from the first bar to the second bar and the second conveyor belt top surfaces transition from the second plane to the first plane when moving from the first bar to the second bar.

16. The conveyor assembly of claim 11, further comprising a drive mechanism in communication with the carriage to move the first and second bars along the first and second conveyor belts between the third pulley and the second pulley.

17. The conveyor assembly of claim 11, wherein the drive mechanism comprises two timing belts attached to the carriage on either side of the first and second conveyor belts.

18. A method for accumulating and discharging a column of evenly spaced items on a conveyor assembly, the method comprising:

rotating a plurality of parallel first conveyor belts;

rotating a plurality of parallel second conveyor belts, the second conveyor belts parallel to the first conveyor belts and interspersed with the first conveyor belts along a given length;

transitioning the first conveyor belts from a first height to second height with respect to a given plane in a direction of rotation within the given length;

transitioning the second conveyor belts from a third height to a fourth height with respect to the given plane in the direction of rotation within the given length, the third height less than the first height and the second height less than the fourth height; and     defining a transition area within the given length of interspersed first and second conveyor belts wherein the first conveyor belts and the second conveyor belts shift laterally in a direction perpendicular to the direction of rotation to transition from the first height to the second height and from the third height to the fourth height respectively.

19. The method of claim 18, wherein the step of defining the transition area further comprises routing the first conveyor belts through high belt guides on a first bar and low belt guides on a second bar and routing the second conveyor belts though low belt guides on the first bar and high belt guides on the second bar and the method further comprises moving the first and second bars along the first and second conveyor belts to move the transition area.

20. The method of claim 18, wherein the step of transitioning the first conveyor belts further comprises moving each first conveyor belt from a top surface of a grooved bed to one of a plurality of parallel grooves in the grooved bed; and     the step of transitioning the second conveyor belts further comprises moving each second conveyor belt from one of the parallel grooves to the top surface.

* * * * *